(12) United States Patent
Yasukawa et al.

(10) Patent No.: US 11,476,987 B2
(45) Date of Patent: *Oct. 18, 2022

(54) TERMINAL FOR D2D COMMUNICATION

(71) Applicant: NTT DOCOMO, INC., Tokyo (JP)

(72) Inventors: Shimpei Yasukawa, Tokyo (JP); Satoshi Nagata, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/065,870

(22) Filed: Oct. 8, 2020

(65) Prior Publication Data

US 2021/0028896 A1  Jan. 28, 2021

Related U.S. Application Data

(63) Continuation of application No. 15/751,578, filed as application No. PCT/JP2016/073574 on Aug. 10, 2016, now Pat. No. 10,841,054.

(30) Foreign Application Priority Data

Aug. 13, 2015 (JP) .............................. JP2015-159994

(51) Int. Cl.
 *H04L 5/00* (2006.01)
 *H04W 92/18* (2009.01)
 (Continued)

(52) U.S. Cl.
 CPC ............ *H04L 5/0042* (2013.01); *H04J 11/00* (2013.01); *H04L 5/0044* (2013.01);
 (Continued)

(58) Field of Classification Search
 CPC ... H04L 5/0042; H04L 5/0044; H04L 5/0051; H04L 5/0053; H04W 72/04; H04W 4/40;
 (Continued)

(56) References Cited

U.S. PATENT DOCUMENTS

2010/0128692 A1  5/2010 Aiba et al.
2015/0327312 A1* 11/2015 Burbidge .............. H04W 76/14
                                                         370/329

(Continued)

OTHER PUBLICATIONS

International Search Report issued in PCT/JP2016/073574 dated Nov. 8, 2016 (3 pages).

(Continued)

*Primary Examiner* — Ivan O Latorre

(74) *Attorney, Agent, or Firm* — Osha Bergman Watanabe & Burton LLP

(57) ABSTRACT

A terminal is disclosed that includes a first transmitter configured to transmit control information for D2D by using a physical control channel for D2D multiplexed with a physical data channel for D2D in a frequency domain and a second transmitter configured to transmit data corresponding to the control information for D2D by using the physical data channel for D2D, where a plurality of the control information for D2Ds are mapped in a wireless resource unit. In other aspects, another terminal is also disclosed.

15 Claims, 10 Drawing Sheets

(51) Int. Cl.
    *H04W 72/04*    (2009.01)
    *H04W 4/40*     (2018.01)
    *H04J 11/00*    (2006.01)
    *H04W 72/10*    (2009.01)

(52) U.S. Cl.
    CPC .......... *H04L 5/0051* (2013.01); *H04L 5/0053* (2013.01); *H04W 4/40* (2018.02); *H04W 72/04* (2013.01); *H04W 72/10* (2013.01); *H04W 92/18* (2013.01); *H04J 2211/005* (2013.01)

(58) Field of Classification Search
    CPC ....... H04W 72/10; H04W 92/18; H04J 11/00; H04J 2211/005
    See application file for complete search history.

(56) References Cited

U.S. PATENT DOCUMENTS

| | | | |
|---|---|---|---|
| 2016/0249355 A1* | 8/2016 | Chae | H04W 72/0446 |
| 2016/0295624 A1* | 10/2016 | Novlan | H04W 72/04 |
| 2016/0302248 A1* | 10/2016 | Yi | H04W 4/023 |
| 2016/0337097 A1 | 11/2016 | Martin et al. | |
| 2016/0366658 A1* | 12/2016 | Chae | H04L 5/0048 |
| 2017/0013661 A1 | 1/2017 | Kalhan | |
| 2017/0134146 A1* | 5/2017 | Chae | H04L 5/0092 |
| 2017/0181186 A1 | 6/2017 | Seo et al. | |
| 2017/0245313 A1* | 8/2017 | Kim | H04W 76/14 |
| 2018/0132254 A1* | 5/2018 | Chae | H04W 72/0453 |

OTHER PUBLICATIONS

Written Opinion of the International Searching Authority issued in PCT/JP2016/073574 dated Nov. 8, 2016 (3 pages).

"Key drivers for LTE success: Services Evolution," Sep. 2011, 3GPP, Internet URL: http://www.3gpp.org/ftp/Information/presentations/presentations_2011/2011_09_LTE_Asia/2011_LTE-Asia_3GPP_Service_evolution.pdf (15 pages).

Extended European Search Report issued in the counterpart European Application No. 16835208.6 dated Jun. 19, 2018 (11 Pages).

ZTE; "Control Channel Design for D2D link"; 3GPP TSG-RAN WG1 Meeting #75, R1-135369; San Francisco, USA, Nov. 11-15, 2013 (5 Pages).

LG Electronics; "D2D Communication Physical Channel Design"; 3GPP TSG RAN WG1 Meeting #75, R1-140331; Prague, Czech Republic, Feb. 10-14, 2014 (6 Pages).

Office action issued in counterpart European Patent Application No. 16835208.6, dated Aug. 5, 2019 (11 Pages).

Sharp; "Time Association Consideration for D2D SA and Data"; 3GPP TSG RAN WG1 Meeting #78, R1-143207; Dresden, Germany, Aug. 18-22, 2014 (3 Pages).

Ericsson; "Frame Structure for D2D-Enabled LTE Carriers and Resources Configuration"; 3GPP TSG-RAN WG1 Meeting #78, R1-143367; Dresden, Germany, Aug. 18-22, 2014 (8 Pages).

* cited by examiner

TERMINAL FOR D2D COMMUNICATION

CROSS-REFERENCE TO RELATED APPLICATIONS

This application is a continuation application of U.S. patent application Ser. No. 15/751,578, filed on Feb. 9, 2018, which is a national phase application of PCT/JP2016/073574, filed on Aug. 10, 2016, which claims priority to Japanese Patent Application No. 2015-159994, filed on Aug. 13, 2015. The contents of these applications are hereby incorporated by reference in their entirety.

TECHNICAL FIELD

The present invention relates to a user device and a method for transmitting a signal.

BACKGROUND ART

In LTE (Long Term Evolution) and succeeding systems of LTE (also referred to as, for example, LTE-A (LTE-Advanced), FRA (Future Radio Access), and 4G), D2D (Device to Device) technology has been considered for executing direct communication between user terminals without a wireless base station intervening (see, for example, Non-patent document 1).

D2D can reduce traffic between user devices and a base station, and enables communication between user devices when a base station becomes unable to execute communication at the time of disasters and the like.

D2D is generally classified into D2D discovery to find out another user terminal being communicable and D2D communication (also referred to as "inter-terminal direct communication", etc.) to communicate directly between terminals. In the following description, the term D2D may be used if distinguishing D2D communication and D2D discovery is not particularly required. Also, a signal transmitted and received in D2D will be referred to as a D2D signal.

Also, in 3GPP (3rd Generation Partnership Project), expanding the D2D functions is considered to implement V2X. Here, V2X is a part of ITS (Intelligent Transport Systems), and as illustrated in FIG. 1, is a generic term of V2V (Vehicle to Vehicle) meaning a communication form executed between an automobile and an automobile; V2I (Vehicle to Infrastructure communication) meaning a communication form executed between an automobile and a road-side unit (RSU) installed on the roadside; V2N (Vehicle to Nomadic device communication) meaning a communication form executed between an automobile and a mobile terminal of the driver; and V2P (Vehicle to Pedestrian communication) meaning a communication form executed between an automobile and a mobile terminal of a pedestrian.

RELATED ART DOCUMENT

Non-Patent Document

[NON-PATENT DOCUMENT 1] "Key drivers for LTE success: Services Evolution," 3GPP, September 2011.

SUMMARY OF THE INVENTION

Problem to be Solved by the Invention

FIG. 2 is a diagram for illustrating a wireless frame configuration and a method for allocating wireless resources in the conventional D2D. PSCCH (Physical Sidelink Control Channel) and PSSCH (Physical Sidelink Shared Channel) are physical channels to implement the above-mentioned "D2D communication", and are assumed to be used for data communication, for example, VoIP communication executed between user devices. As illustrated in FIG. 2, in D2D, resource pools for PSCCH and PSSCH are allocated divided up and down inside of resources allocated to PUCCH among all resources of an uplink. The resource pools of the PSCCH and PSSCH are allocated in the time axis direction periodically by periods of 40 ms or longer, to which repetition transmission for repeatedly transmitting the same data of SCI (Sidelink Control Information) and MACPDU (Media Access Control Packet Data Unit), and transmission by the time/frequency hopping are applied. Also, in the PSSCH, wireless resources are allocated consecutively and periodically by comparatively short intervals so that multiple MACPDUs used for VoIP can be transmitted consecutively. Specifically, all wireless resources in FIG. 2 designated with MACPDUs are allocated in single SCI.

Here, it is assumed in V2X that small packets of 50 to 150 bytes are transmitted and received by using the PSCCH and PSSCH. Further, such small packets are assumed to be transmitted periodically at comparatively long intervals such as 100 ms to 1 s, or to be transmitted by an event trigger. Also, there is a demand for V2X to realize further lower delay because important communication (e.g., communication for accident prevention and traffic jam avoidance) is executed.

However, since the PSCCH and PSSCH used in the present D2D communication are originally assumed to be used for VoIP communication and the like, wireless resources of the PSSCH are designed to be allocated consecutively and periodically by short intervals. Therefore, if used for transmitting packets that are not transmitted as frequently as in V2X, there is a problem in that wireless resources are allocated wastefully.

Also, for the PSCCH and PSSCH used in the present D2D communication, the resource pool of the PSCCH and the resource pool of the PSSCH are specified to have comparatively long periods (40 ms or longer), and hence, the delay is long after SCI has been transmitted until the data is actually transmitted by the PSSCH.

On the other hand, one may consider making the PSCCH period shorter, though specified to be set 40 ms or longer, for shortening the delay while preventing that wireless resources are allocated wastefully. However, since the present SCI format has a comparatively large data size, increasing the number of transmissions by the present SCI format as is cannot be said to be effective.

In view of the above, the technology in the present disclosure has been developed, and an object is to provide the technology in D2D communication that makes it possible to transmit and receive small packets effectively and with a low delay.

Means for Solving the Problem

A user device according to the disclosed technology is the user device in a wireless communication system supporting D2D communication that includes a first transmitter configured to transmit control information for D2D by using a physical control channel for D2D in a wireless frame configuration in which the physical control channel for D2D and a physical data channel for D2D are frequency-multiplexed; and a second transmitter configured to transmit data corresponding to the control information for D2D by using the physical data channel for D2D in the wireless frame configuration in which the physical control channel for D2D and the physical data channel for D2D are multiplexed in a frequency domain.

Also, another user device according to the disclosed technology is the user device in a wireless communication system supporting D2D communication that includes a first transmitter configured to transmit control information for D2D by using a physical control channel for D2D in a subframe in which the physical control channel for D2D and a physical data channel for D2D are sequentially time-multiplexed; and a second transmitter configured to transmit data corresponding to the control information for D2D by using the physical data channel for D2D in the subframe or a physical data channel in a subframe different from the subframe.

Effect of the Present Invention

According to the disclosed technology, the technology in D2D communication is provided that makes it possible to transmit and receive small packets effectively and with a low delay.

EMBODIMENTS FOR CARRYING OUT THE INVENTION

In the following, embodiments of the present invention will be described with reference to the drawings. Note that the embodiments described below are just examples, and embodiments to which the present invention can be applied to are not limited to the following embodiments. For example, wireless communication systems according to the embodiments assume types of systems compatible with the LTE, but the present invention is not limited to the LTE and applicable to other types. Note that in the present specification and claims, "LTE" is used in a broad meaning that includes not only communication schemes corresponding to Release 8 and 9 of 3GPP, but also the fifth generation communication schemes corresponding to Release 10, 11, 12, and 13, and Releases 14 and after of 3GPP.

<<System Configuration>>

Figure 3:
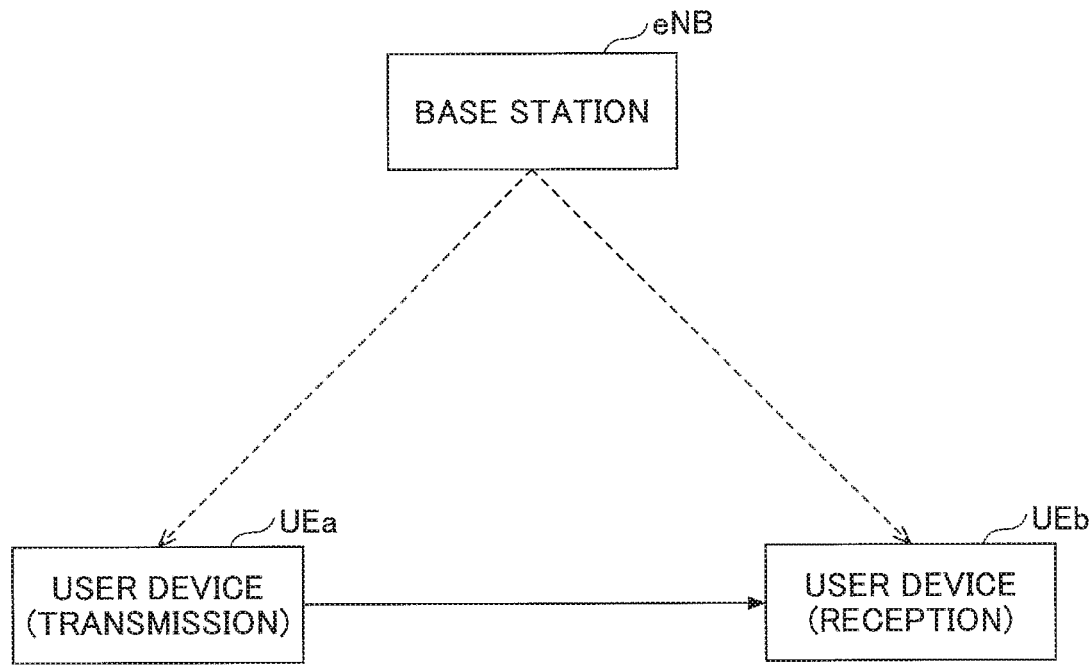
FIG. 3 is a diagram illustrating an example of a configuration of a wireless communication system according to an embodiment.

As illustrated in FIG. 3, a wireless communication system in the embodiment includes a base station eNB, a user device UEa on the transmitting side that transmits D2D signals, and a user device UEb on the receiving side that receives D2D signals. The base station eNB executes allocation of the resource pool used for transmitting and receiving of a D2D signal, and the like, by using, for example, notification information of a macro cell (system information: SIB), RRC (Radio Resource Control), or the like. Note that in the following description, the user device UEa on the transmitting side and the user device UEb on the receiving side may be collectively referred to as the "user device UE".

In this embodiment, the user devices UE include an automobile, a mobile terminal of the driver, and a mobile terminal of a pedestrian specified as in V2X. Also, unless otherwise specified, an RSU specified in V2X may be the user device UE or may be the base station eNB in the embodiment.

Figure 1:
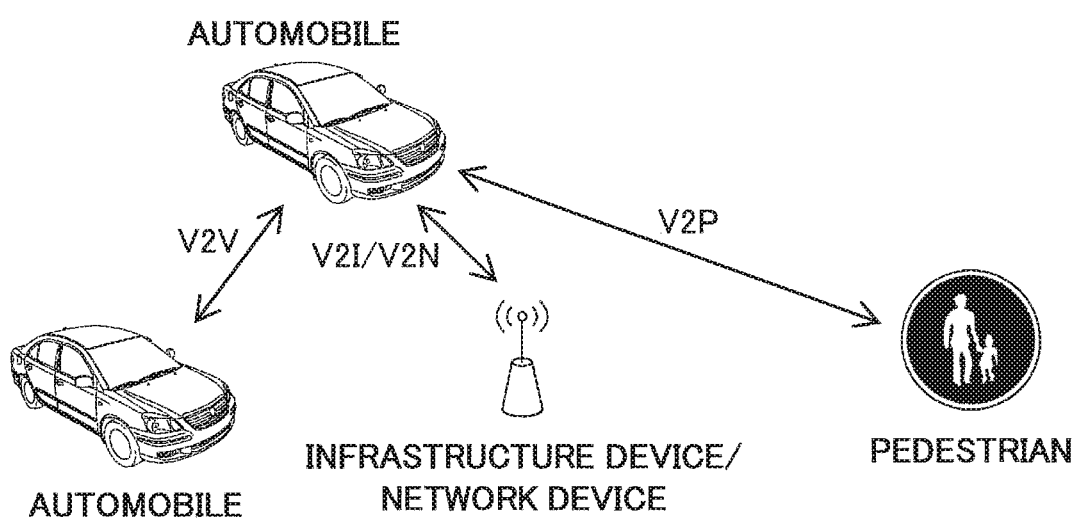
FIG. 1 is a diagram for illustrating V2X.

In the embodiment, D2D communication is executed by using a wireless frame configuration that can realize a lower delay, which is different from the wireless frame configuration (FIG. 1) used in the conventional D2D. Also, in the embodiment, wireless resources are not allocated a lot in short periods as done in the conventional D2D, but the wireless resources are allocated to be suitable for transmitting by comparatively long periods and by an event trigger. Also, in the embodiment, a part of control information to be included in SCI is omitted to make it possible to execute communication by using the SCI whose data size is smaller than in the conventional D2D. Thus, compared to the conventional D2D, small packets can be transmitted and received effectively and with a low delay.

<<Wireless Frame Configuration>>

First, a wireless frame configuration used in the embodiment will be described. Note that in the following description, data corresponding to SCI means data transmitted by wireless resources designated in control information (including information about allocation of the wireless resources) included in the SCI as in the conventional D2D. Also, in the following description, "data" means MACPDU unless otherwise specified.

<Configuration Having PSCCH and PSSCH Frequency-Multiplexed>

Figure 4:
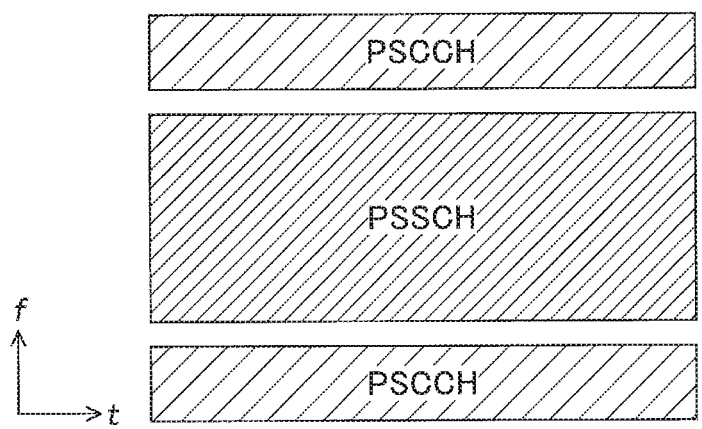
FIG. 4 is a diagram illustrating a wireless frame configuration (1) in an embodiment.

FIG. 4 is a diagram illustrating a wireless frame configuration (1) in an embodiment. As illustrated in FIG. 4, in the embodiment, the user device UE may execute D2D communication by using a wireless frame configuration having the PSCCH and PSSCH frequency-multiplexed. The user device UE can map SCI and data onto respective subframes by using the wireless frame configuration (1). In other words, the user device UEa on the transmitting side can map data corresponding to the SCI that has been transmitted by a subframe onto subframes after the subframe, to transmit the data. This makes it possible for the user device UEb on the receiving side to obtain the data in the subframes after the subframe with which the SCI has been received, and hence, the delay will be shortened considerably.

As a modified example, the PSCCH and PSSCH may not be frequency-multiplexed but treated as a common or overlapped resource pool to expand the frequency resources that can transmit SCI and data. In this case, to improve precision of blind detection of SCI, a symbol of a reference signal and/or a synchronization signal may be multiplexed at the head of the SCI transmission subframe. The frequency resources having a reference signal and/or a synchronization signal multiplexed may be the same as the frequency resources of the SCI, or predetermined frequency resources independent from the frequency resources of the SCI (for example, central six PRBs). Limiting the frequency resources makes it easier to detect the presence or absence of the SCI.

(About Correspondence Between SCI and Data)

Figure 5A:
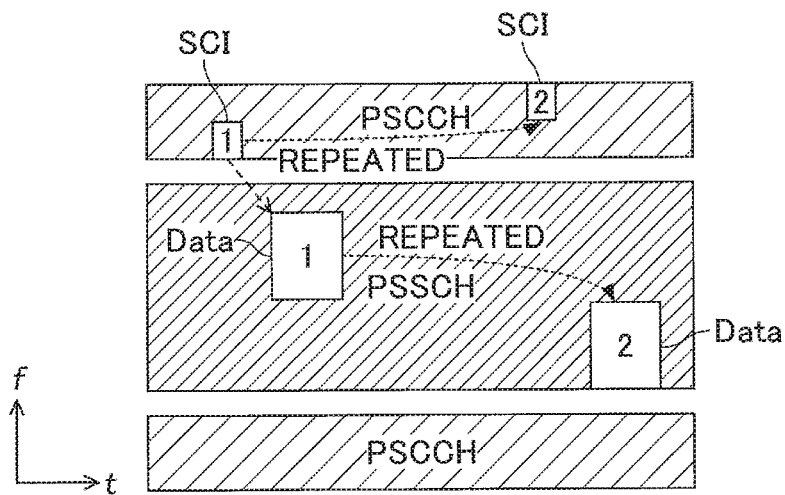
FIG. 5A is a diagram for illustrating a correspondence between SCI and data.
Figure 5B:
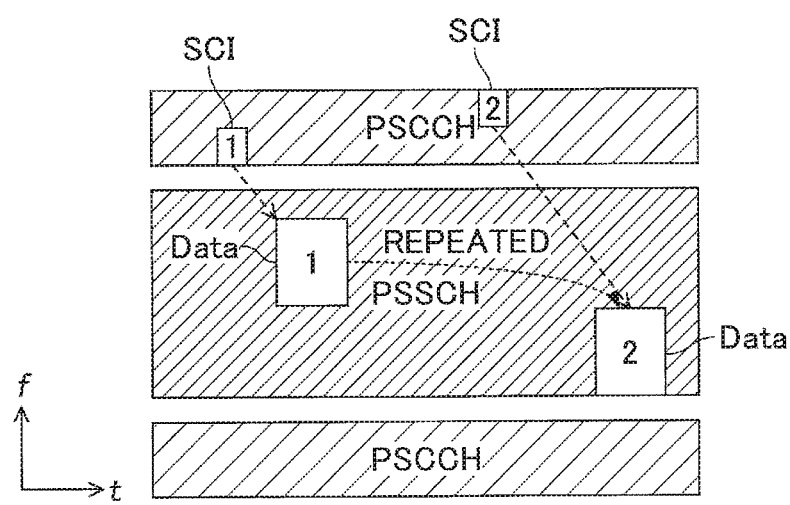
FIG. 5B is a diagram for illustrating a correspondence between SCI and data.

FIGS. 5A-5B are diagrams for illustrating correspondence between SCI and data. In the case of using the wireless frame configuration (1), the same SCI and the same data may be transmitted repeatedly following predetermined hopping patterns, respectively, as done in the conventional D2D (repetition transmission). For example, as illustrated in FIG. 5A, the same SCI (SCI "1" and "2" in FIG. 5A) may be transmitted repeatedly, and as for the data corresponding to the SCI, the same data (Data "1" and "2" in FIG. 5A) are transmitted repeatedly. Thus, unlike in the conventional D2D, transmitting the SCI and transmitting the data corresponding to the SCI are executed concurrently, and hence, the delay can be shortened considerably.

Also, as another example, only the data is transmitted repeatedly, and the SCI may have one-to-one correspondence with each of the data items. For example, as illustrated in FIG. 5B, the same data (Data "1" and "2" in FIG. 5B) may be transmitted repeatedly whereas SCI "1" corresponds to Data "1" and SCI "2" corresponds to Data "2". In the case of FIG. 5B, since the content of SCI "1" is different from the content of SCI "2", the user device UEb on the receiving side needs to obtain both SCI "1" and SCI "2" to obtain Data "1" and "2", but does not need allocation information of the wireless resources with respect to repetition of the data, and hence, the data size of the control information included in each of the SCI items can be reduced. Also, as in FIG. 5A, transmitting the SCI and transmitting the data corresponding to the SCI are executed concurrently, and hence, the delay can be shortened considerably.

(About Mapping of SCI)

Figure 6:
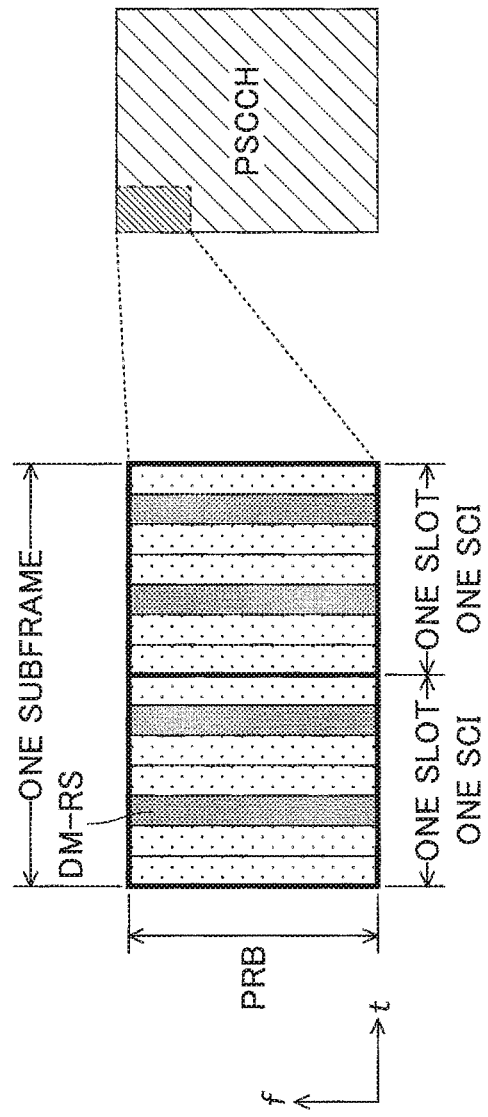
FIG. 6 is a diagram illustrating an example of a method for mapping SCI in a subframe.

FIG. 6 is a diagram illustrating an example of a method for mapping SCI in a subframe. Although the conventional D2D specifies that single SCI is mapped in the wireless resources for one subframe and one PRB (Physical Resource Block), multiple SCI may be mapped in the wireless resources for one subframe and one PRB in the embodiment. For example, SCI may be mapped one by one in the respective wireless resources of one slot and one PRB as illustrated in FIG. 6. Also, there may be multiple PRBs (e.g., two PRBs) in the frequency direction in FIG. 6 to secure the data size of SCI that can be transmitted. Thus, if the user device UEb on the receiving side cannot receive one of the SCI items, but can receive the other SCI item, the user device UEb can obtain the data corresponding to the SCI, thereby the reliability of the communication can be raised.

<Configuration Having PSCCH and PSSCH Time-Multiplexed>

Figure 7A:
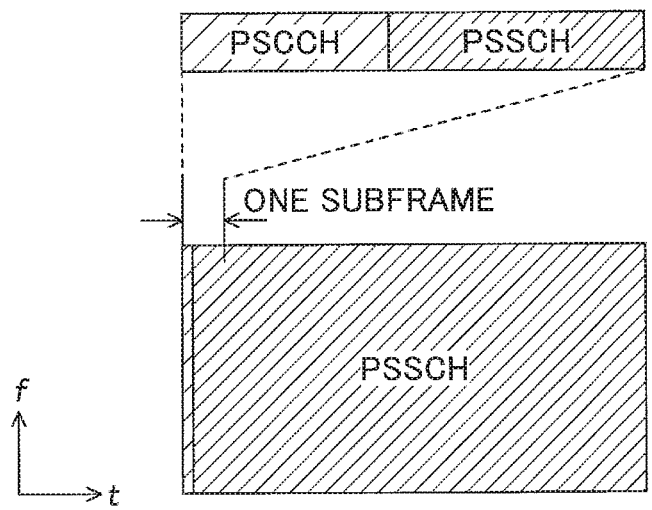
FIG. 7A is a diagram illustrating a wireless frame configuration (2) in an embodiment.
Figure 7B:
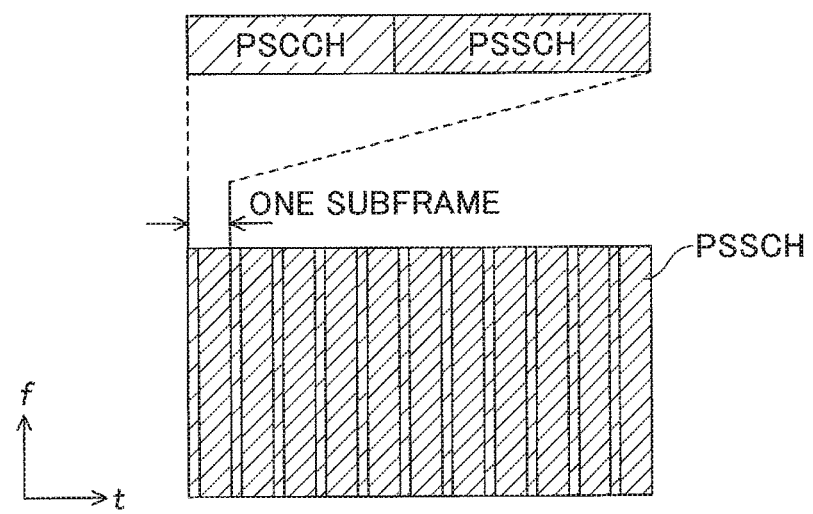
FIG. 7B is a diagram illustrating a wireless frame configuration (2) in an embodiment.

FIGS. 7A-7B are diagrams illustrating wireless frame configurations (2) in an embodiment. As illustrated in FIGS. 7A-7B, in the embodiment, the user device UE may execute D2D communication by using a wireless frame configuration that has the PSCCH and PSSCH time-multiplexed in one subframe.

For example, as illustrated in FIG. 7A, a predetermined subframe may have the PSCCH and PSSCH time-multiplexed and allocated, and subsequent one or more subframes have only the PSSCH allocated. Also, as illustrated in FIG. 7B, each subframe may have the PSCCH and PSSCH time-multiplexed and allocated. Note that there is no particular limit in terms of the number of symbols to which the PSCCH are allocated, and the number of symbols to which the PSSCH are allocated in one subframe. Also, there may be multiple PRBs (e.g., six PRBs) in the frequency direction in FIGS. 7A-7B to secure the data size of SCI that can be transmitted.

The user device UE can map SCI and data onto one subframe by using the wireless frame configuration (2). In other words, the user device UEa on the transmitting side can map the data corresponding to the SCI that has been transmitted by a subframe onto the same subframe or the following subframes, to transmit the data. This makes it possible for the user device UEb on the receiving side to obtain the data in the same subframe or the following subframes with which the SCI has been received, and hence, the delay can be shortened considerably.

(About Mapping of SCI, Data, and Reference Signal)

Figure 8A:
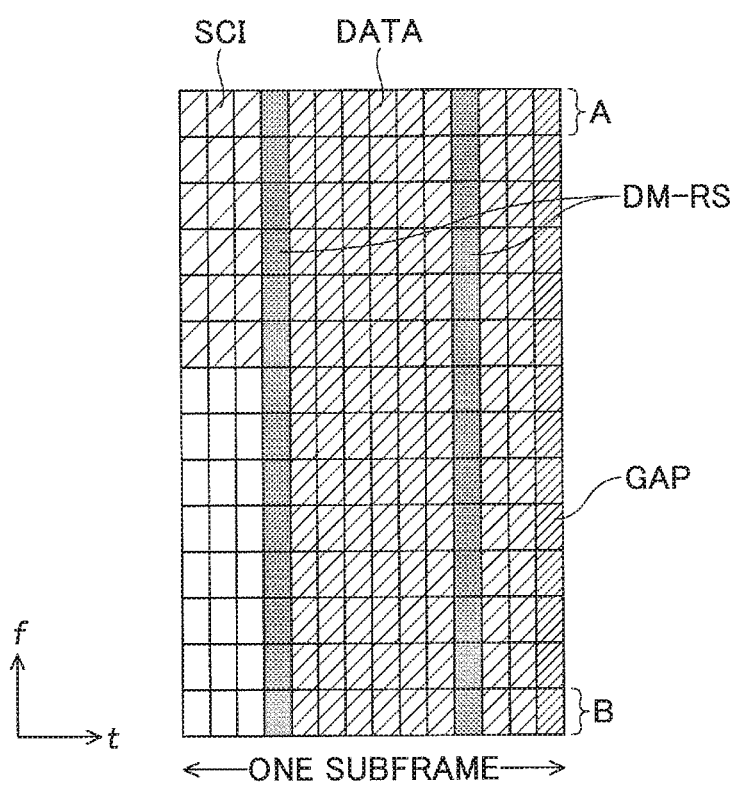
FIG. 8A is a diagram illustrating an example of an arrangement structure of SCI, data, and a reference signal in one subframe.
Figure 8B:
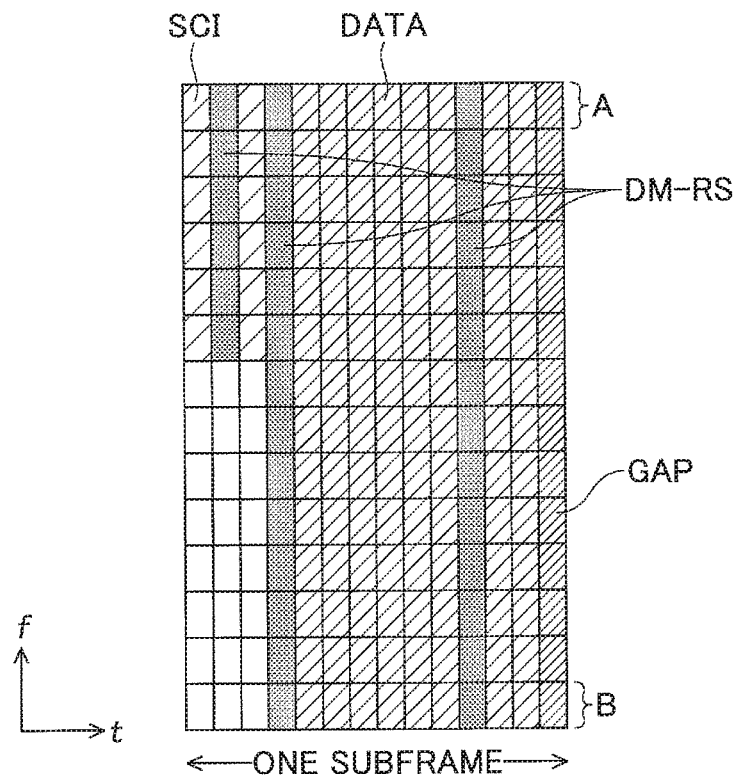
FIG. 8B is a diagram illustrating an example of an arrangement structure of SCI, data, and a reference signal in one subframe.

FIGS. 8A-8B are diagrams illustrating examples of arrangement structures of SCI, data, and a reference signal in one subframe. When executing D2D communication by using a wireless frame configuration having the PSCCH and PSSCH time-multiplexed in one subframe, the user device UEa may map SCI, data, and a DM-RS (Demodulation Reference Signal) in one subframe for transmission. The transmission bands of the SCI, data, and DM-RS may be the same or may be different. For example, as illustrated in FIG. 8A, the user device UEa on the transmitting side may transmit the SCI and the data in different transmission bands, respectively, and may transmit the DM-RS by a symbol similar to that in the conventional D2D. Also, the user device UEb on the receiving side may commonly use the DM-RS in channel estimation when decoding the SCI and the data. When decoding the SCI and the data, the user device UEb can execute the channel estimation by substantially the same channel estimation precision as the conventional precision.

Further, as illustrated in FIG. 8B, the user device UEa on the transmitting side may transmit the DM-RS in the same transmission band as the transmission band of the SCI. This makes it possible for the user device UEb on the receiving side to improve the channel estimation precision in the symbol onto which the SCI is mapped.

Note that a symbol of a reference signal and/or a synchronization signal may be time-multiplexed at the head of a subframe for AGC (Automatic Gain Control) and/or for improving synchronization precision. The frequency resources in which a reference signal and/or a synchronization signal is multiplexed may be the same as the frequency resources of the SCI, or predetermined frequency resources independent from the frequency resources of the SCI (for example, central six PRBs). Limiting the frequency resources makes it easier to detect the presence or absence of the SCI.

<<Configuration of SCI>>

Next, a configuration of SCI used in the embodiment will be described. As described earlier, in the embodiment, wireless resources are not allocated a lot in short periods as done in the conventional D2D, but the wireless resources are allocated to be suitable for transmitting by comparatively long periods and by an event trigger. To make this possible, a time interval (a subframe section) can be specified in SCI during which data can be transmitted. Also, in the embodiment, a part of the control information to be included in the SCI is omitted to make it possible to execute communication by using SCI whose data size is smaller than in the conventional D2D.

(About Time Interval During which Data can be Transmitted)

Figure 2:
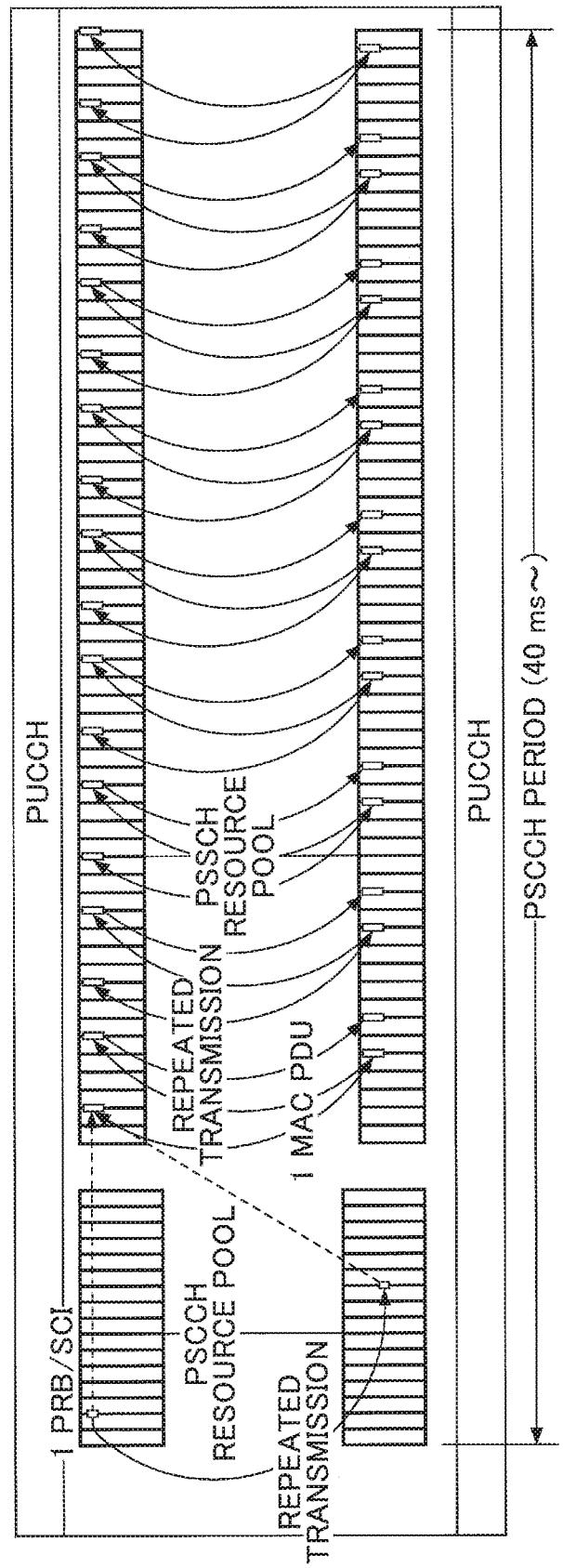
FIG. 2 is a diagram for illustrating a wireless frame configuration and a method for allocating wireless resources in the conventional D2D.
Figure 9:
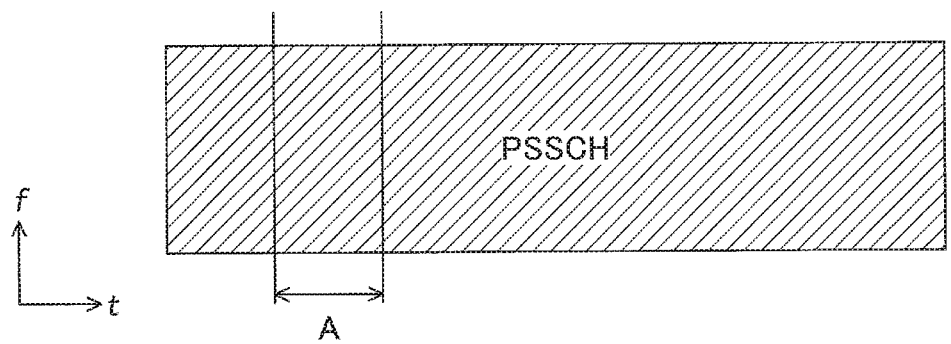
FIG. 9 is a diagram for illustrating a time interval during which data can be transmitted.

In the conventional D2D, as illustrated in FIG. 2, all wireless resources designated with MACPDUs are allocated for single SCI. Thus, in the embodiment, the user device UE may have SCI include information to specify a time interval (a subframe section) onto which the data is mapped in the resource pool of the PSSCH. Note that a time interval (a subframe section) onto which data is mapped in the resource pool of the PSSCH means any subframe section on the time axis in the resource pool of the PSSCH, for example, a section designated by "A" in FIG. 9.

The time interval (subframe section) onto which data is mapped may be specified by a start point and an end point of the resources onto which data is mapped by using SFN (System Frame Number) or DFN (Direct Frame Number), or may be specified using SFN (or DFN) and subframe numbers. Also, the end point may be represented by the number of subframes from the start point, or may be represented by the number of MACPDUs. Also, the start point and the end point may be specified combined with information representing a subframe pattern of the wireless resources onto which the data is mapped (T-RPT (Time Resource Pattern)).

(About Data Size of SCI)

In the embodiment, an SCI format not including SCI may be newly specified in which a TA value included in SCI (Timing Advanced indication) is omitted. The TA value is information used for preventing interference of symbols between D2D communication and UL (Uplink) communication to the base station eNB from the user device UE, which is used by the user device UEa on the transmitting side to indicate a reception timing of the PSSCH to the user device UEb on the receiving side. Therefore, for a case where D2D communication and UL communication to the base station eNB from the user device UE do not share the same wireless resources, for such a case where D2D communication is executed using a carrier specialized in D2D communication, an indication of the TA value is not necessary. Also, even for a case where D2D communication and UL communication to the base station eNB from the user device UE share the same wireless resources, if the interference between symbols is permissible, an indication of the TA value is not necessary. Note that if the TA value to be included in the SCI is omitted, the TA value may be considered to be 0, or may be considered to be a predetermined fixed value. This makes it possible to reduce the data size of SCI.

Also, in an embodiment, a wireless resource in the time axis by which SCI is transmitted (e.g., a wireless resource identified by a DFN (DFN) and a subframe number) may be associated one-to-one with a wireless resources by which data is transmitted (e.g., a wireless resource identified by a DFN (DFN) and a subframe number), to newly specify an SCI format in which information about the wireless resources in the time axis (e.g., T-RPT) to be included in the SCI is omitted.

Also, the number of subframes (a timeline) from a subframe by which SCI is transmitted to a subframe by which the data is transmitted may be specified in advance, to newly specify an SCI format in which information about the wireless resources in the time axis (e.g., T-RPT) to be included in the SCI is omitted. The number of subframes (a timeline) may be indicated to the user device UE from the base station eNB through an RRC signal, notification information (SIB), and a control signal on Layer 1 or Layer 2, or may be indicated by an RSU corresponding to the base station eNB. Also, the timeline may be set in a SIM (Subscriber Identity Module) in advance, or may be indicated through a control signal on an upper layer transmitted from the core network.

Also, SCI and data transmitted by the wireless frame configuration as previously described in FIGS. 8A-8B may be associated one-to-one. Specifically, the wireless resources by which the SCI is transmitted may be associated one-to-one with the wireless resources by which the data is transmitted, to newly specify an SCI format in which information about the wireless resources in the time axis (e.g., T-RPT) is omitted among the control information included in the SCI. For example, the user device UEa on the transmitting side may have control information about the data (MCS (Modulation and Coding Scheme) and the like) at the positions illustrated in FIG. 8A or FIG. 8B included in the SCI at the positions illustrated in FIG. 8A or FIG. 8B (wireless resources), so that the user device UEb on the receiving side, when having obtained the SCI at the positions illustrated in FIG. 8A or FIG. 8B, decodes the data at the positions illustrated in FIG. 8A or FIG. 8B by using the control information included in the SCI.

Also, as another example, the SCI at the positions illustrated in FIG. 8A or FIG. 8B may store only the frequency B (or information to identify the subcarrier position of B) of the wireless resources on which data is transmitted in the frequency domain (A to B), to implicitly indicate that the frequency (subcarrier) A is the same as the frequency at one end of the frequency domain (namely, the position of A) by which the SCI has been received.

Also, one may consider having the user device UE execute LBT (Listen Before Talk) when going to transmit a D2D signal. LBT is a mechanism to prevent a collision of signals transmitted by multiple transmitting stations, by confirming (carrier sensing) whether a free communication path is available before transmitting a signal through the communication path. When LBT is performed, the user device UEa on the transmitting side may have completed transmitting data before other user devices UE start transmitting data. Therefore, it may be assumed that the user device UEa may execute an operation, for example, to transmit data collectively by consecutive subframes. Thus, instead of T-RPT among the control information included in SCI, an SCI format may be newly specified that includes information to designate a data-transmitting section (e.g., a subframe to start transmitting data and a subframe to end transmitting data). Also, the SCI may include a flag that represents whether T-RPT is set or information to designate the data-transmitting section is set.

Also, in the embodiment, by having wireless resources on the frequency axis on which SCI is to be transmitted (positions of resource elements or subcarriers, and the like) associated one-to-one with wireless resources on the frequency axis on which the data is to be transmitted (positions of resource elements or subcarriers, and the like), an SCI format may be newly specified in which the data size is reduced for information about the wireless resources on the frequency axis included in the SCI (e.g., all or a part of frequency hopping flag, resource block allocation, and hopping resource allocation).

Also, in the embodiment, by having the user device UE transmit data by using all bands in the resource pool of the PSSCH, an SCI format may be newly specified in which the data size is reduced for information about the wireless resources on the frequency axis included in the SCI. Also, by expanding the bandwidth of a subband set in the frequency band, or by fixing the bandwidth for transmitting data, an SCI format may be newly specified in which the data size is reduced for information about the wireless resources on the frequency axis included in the SCI.

Also, the number of bits for CRC may be reduced (e.g., eight bits) when transmitting the SCI. These new SCI formats described above for reducing the data size of SCI may be combined with each other.

(About Detection of Multiple SCI Formats)

If an SCI format is to be newly specified as described in the embodiment, the user device UEb on the receiving side needs to distinguish whether SCI to be received is compatible with the SCI format (SCI format 0) specified in the conventional D2D or a new SCI format in the embodiment. The user device UEb on the receiving side may attempt blind detection for each SCI format, to recognize the type of the SCI format by which the SCI is transmitted.

Here, if the user device UEb on the receiving side executes blind detection to recognize the type of the SCI format, one may be concerned about an increased processing load on the user device UE. Thus, in the embodiment, depending on a range of the wireless resources allocated to the PSCCH (a particular resource pool, a particular search space, or the like), switching may be done between using the SCI format specified in the conventional D2D and using a new SCI format. Specifically, the user device UEa on the transmitting side transmits the SCI in the SCI format specified in the conventional D2D if transmitting the SCI in a range of the wireless resources specified to use the conventional SCI format; or transmits the SCI in a new SCI format if transmitting the SCI in a range of the wireless resources specified to use the new SCI format. Similarly, the user device UEb on the receiving side determines that the SCI format specified in the conventional D2D is used and decodes the SCI accordingly if receiving the SCI in a range of the wireless resources specified to use the conventional SCI format; or determines that a new SCI format is used and decodes the SCI accordingly if receiving the SCI in a range of the wireless resources specified to use the new SCI format.

Also, as another method in the embodiment, a new SCI format may be specified to have the same data size as the SCI format specified in the conventional D2D, to make the type of an SCI format identifiable by using an unused value in the SCI format specified in the conventional D2D. Specifically, a set value for the case of MCS being 64 QAM or the like may be used to make the type of an SCI format identifiable.

Also, as another method in the embodiment, a new SCI format may be specified to have the same data size as the SCI format specified in the conventional D2D, to make the type of an SCI format identifiable by changing a bit mask of CRC depending on the SCI format.

<<About Data Detectable by Blind Detection>>

As described above, the user device UEb on the receiving side recognizes the wireless resources onto which the data is mapped on the resource pool of the PSSCH from the control information included in the SCI, to decode the data. In other words, to receive the data, the user device UEb on the receiving side needs to receive the SCI corresponding to the data.

In V2X, the user device UE is assumed to transmit data having a high emergency, for example, to be used for avoiding a collision. To make it possible to transmit and receive data having such a high emergency with a low delay, in the embodiment, the wireless resources are secured (reserved) in advance on the resource pool of the PSCCH and/or the PSSCH, by which data having the payload size of a fixed length can be transmitted, and the user device UE on the receiving side monitors the wireless resources. Note that in the following description, the wireless resources that are secured (reserved) in advance by which data having the payload size of a fixed length can be transmitted, will be referred to as the "virtual resource pool".

Figure 10A:
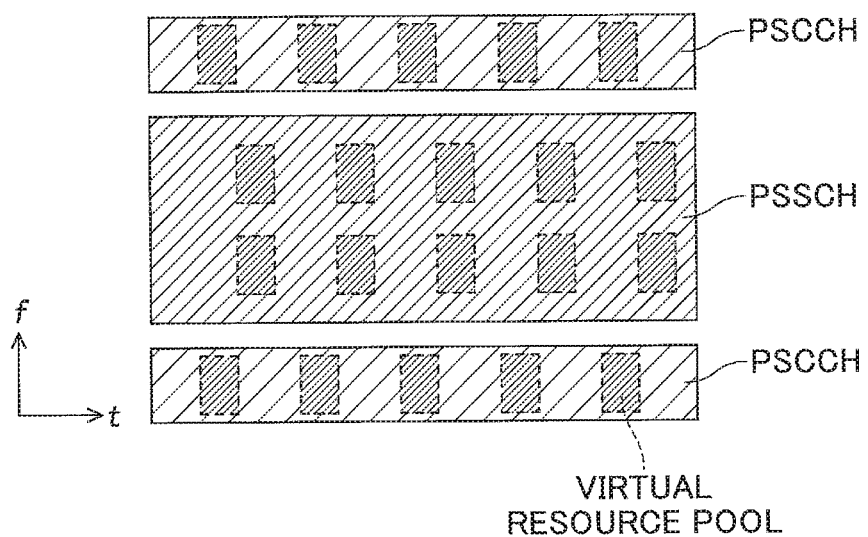
FIG. 10A is a diagram illustrating an example of a virtual resource pool.
Figure 10B:
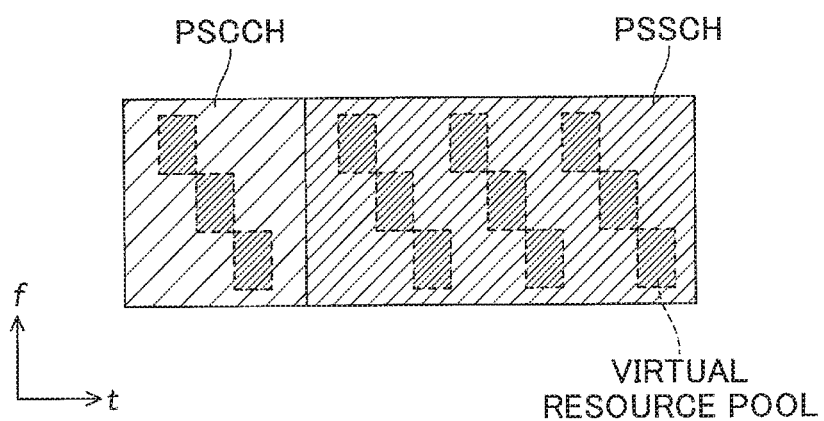
FIG. 10B is a diagram illustrating an example of a virtual resource pool.

FIGS. 10A-10B are diagrams illustrating examples of virtual resource pools. FIG. 10A illustrates an example in which a virtual resource pool is secured on the resource pool of the PSCCH and PSSCH having the wireless frame configuration illustrated in FIG. 4; and FIG. 10B illustrates an example in which a virtual resource pool is secured on the resource pool of the PSCCH and PSSCH having the wireless frame configuration illustrated in FIGS. 7A-7B. Note that the positions of the virtual resource pools illustrated in FIGS. 10A-10B are just examples, and the virtual resource pools may be secured at other positions.

Fixed values specified in advance are applied to the MCS, the TA value, and the resource size to be applied to a message having high emergency transmitted and received in the virtual resource pool. This makes it possible for the user device UE on the receiving side to decode data having a high emergency without receiving the SCI.

Note that in the virtual resource pool, transmitting data other than having a high emergency may be inhibited. Also, to prevent congestion in the virtual resource pool due to transmission of data having high emergency from multiple user devices UE, shares of the virtual resource pool and/or ratios of transmission time may be specified for the respective user devices UE. Also, types (UE categories and the like) of the user devices UE that can transmit data in the virtual resource pool may be specified in advance. Also, types of data that can be transmitted may be specified in advance for each virtual resource pool.

Also, information indicating the position of the virtual resource pool may be indicated to the user device UE from the base station eNB through an RRC signal, notification information (SIB), and a control signal on Layer 1 or Layer 2, or may be indicated by an RSU corresponding to the base station eNB. Also, the information may be set in the SIM (Subscriber Identity Module) in advance, or may be indicated through a control signal on an upper layer transmitted by the core network.

<<Functional Configuration>>

An example of a functional configuration of the user device UE will be described that executes operations in the embodiment described above.

Figure 11:
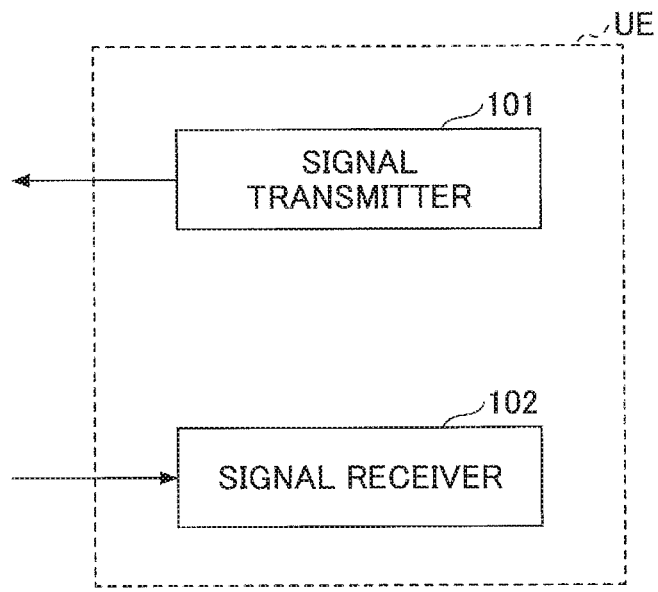
FIG. 11 is a diagram illustrating an example of a functional configuration of a user device according to an embodiment.

FIG. 11 is a diagram illustrating an example of a functional configuration of a user device according to an embodiment. As illustrated in FIG. 11, the user device UE includes a signal transmitter 101 and a signal receiver 102. Note that FIG. 11 only illustrates functional parts in the user device UE particularly relating to the embodiment of the present invention; the user device UE may also include functions not illustrated at least for executing operations compatible with LTE. Also, the functional configuration illustrated in FIG. 11 is just an example. Functional partitioning and names of the functional parts may be determined discretionarily as long as operations can be executed according to the embodiment.

The signal transmitter 101 includes a function to generate various signals on the physical layer from a signal on a higher layer to be transmitted from the user device UE, and to wirelessly transmit the signals. The signal transmitter 101 also includes a function to transmit D2D signals (SCI, MACPDU, and the like) and a function to transmit by cellular communication.

Also, the signal transmitter 101 may transmit SCI by using the PSSCH in a wireless frame configuration in which the PSCCH and PSSCH are frequency-multiplexed, to transmit data corresponding to the SCI by using the PSSCH in the wireless frame configuration in which the PSCCH and PSSCH are frequency-multiplexed. Furthermore, the signal transmitter 101 may transmit the data by a predetermined subframe corresponding to the subframe by which the SCI has been transmitted.

Also, the signal transmitter 101 may transmit SCI by using the PSCCH in a subframe in which the PSCCH and PSSCH are sequentially time-multiplexed, to transmit data corresponding to the SCI by using the PSSCH in the subframe or the PSSCH in a subframe different from the subframe. Furthermore, the signal transmitter 101 may map a reference signal (DM-RS) onto a symbol at the center among multiple symbols that are consecutive and correspond to the PSCCH, to map the SCI onto a symbol other than the symbol onto which the reference signal is mapped among the symbols that are consecutive, to transmit the SCI.

Also, the signal transmitter 101 may transmit the data by using a specific wireless resource used for transmitting data having a predetermined data length to be prioritized among the wireless resources allocated to the PSCCH or the PSSCH.

Also, the signal transmitter 101 may transmit the data by a subcarrier corresponding to a subcarrier by which the SCI has been transmitted.

Also, the signal transmitter 101 may determine whether to transmit the SCI by using the conventional SCI format or by using a new SCI format in the embodiment, depending on a range of the wireless resources allocated to the PSCCH.

Note that the signal transmitter 101 may include a first transmitter to transmit the SCI in the PSCCH and a second transmitter to transmit the data in the PSSCH.

The signal receiver 102 includes a function to wirelessly receive various signals from another user device UE or the base station eNB, and to obtain a signal on a higher layer from the received signals on the physical layer. The signal transmitter 102 also includes a function to receive D2D signals (SCI, MACPDU, and the like) and a function to receive by cellular communication.

Also, the signal receiver 102 may receive SCI by using the PSSCH in a wireless frame configuration in which the PSCCH and PSSCH are frequency-multiplexed, to receive data corresponding to the SCI by using the PSSCH in the wireless frame configuration in which the PSCCH and PSSCH are frequency-multiplexed. Furthermore, the signal receiver 102 may receive the data by a predetermined subframe corresponding to the subframe by which the SCI has been transmitted.

Also, the signal receiver 102 may receive SCI by using the PSCCH in a subframe in which the PSCCH and PSSCH are sequentially time-multiplexed, to receive data corresponding to the SCI by using the PSSCH in the subframe or the PSSCH in a subframe different from the subframe. Furthermore, the signal receiver 102 may use a reference signal (DM-RS) mapped onto a symbol at the center among multiple symbols that are consecutive and correspond to the PSCCH, to execute channel estimation when decoding the SCI.

Also, the signal receiver 102 may monitor a specific wireless resource used for transmitting data having a predetermined data length to be prioritized among the wireless resources allocated to the PSCCH or the PSSCH, to obtain the data based on the MCS, the TA value, and the resource size specified in advance as fixed values.

Also, the signal receiver 102 may receive the data by a subcarrier corresponding to a subcarrier by which the SCI has been received.

Also, the signal receiver 102 may determine whether the received SCI uses the conventional SCI format or a new SCI format in the embodiment, depending on a range of the wireless resources allocated to the PSCCH. Note that the signal receiver 102 may include a first receiver to receive the SCI in the PSCCH and a second receiver to receive the data in the PSSCH.

<Hardware Configuration>

The block diagram (FIG. 11) used for describing the embodiments illustrate blocks in units of functions. These functional blocks (elements) are implemented by any combinations of hardware and/or software. Further, a method for implementing each functional block is not specifically limited. In other words, each functional block may be implemented by a single device that is physically and/or logically combined, or may be implemented by multiple devices by directly and/or indirectly (e.g., wired and/or wireless) connecting the two or more devices that are physically and/or logically separated.

Figure 12:
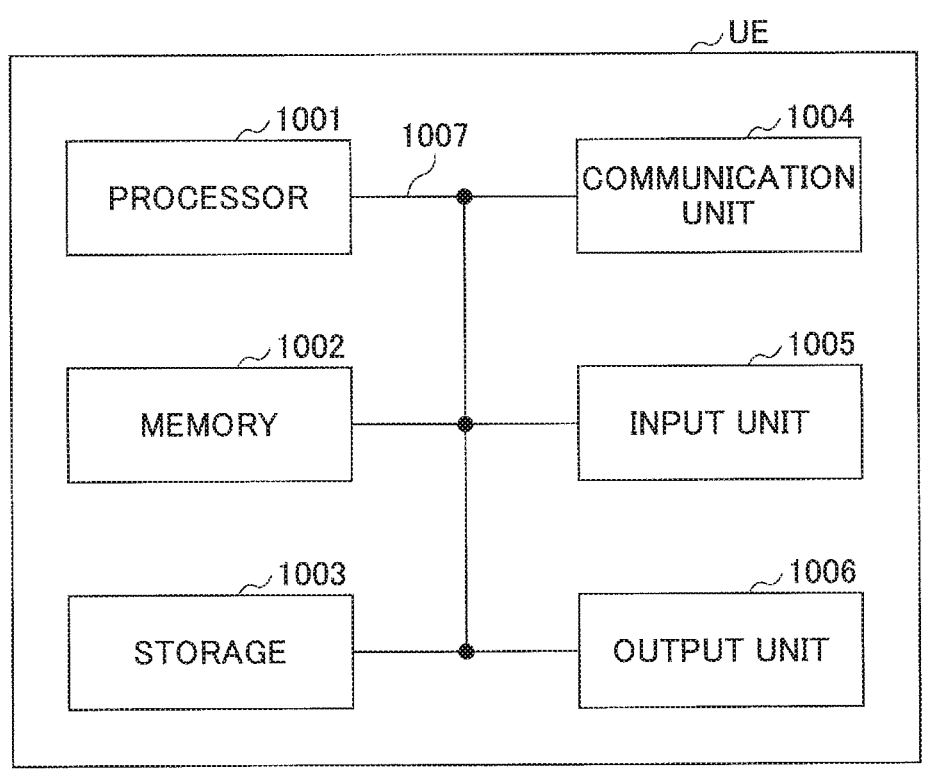
FIG. 12 is a diagram illustrating an example of a hardware configuration of a user device according to an embodiment.

For example, the user device UE according to an embodiment of the present invention may function as a computer to execute a process of the method for transmitting a signal according to the present invention. FIG. 12 is a diagram illustrating an example of a hardware configuration of the user device UE according to the embodiment. The user device UE described above may be physically configured as a computer device including a processor 1001, a memory 1002, a storage 1003, a communication unit 1004, an input unit 1005, an output unit 1006, and a bus 1007.

Note that in the following description, the term "apparatus" may be replaced with a circuit, a device, a unit, or the like. The hardware configurations of the user device UE may be arranged to include one or more of the devices illustrated in the figure, or may be arranged not to include a part of the devices.

Each function of the user device UE may be implemented by loading predetermined software (a program) into the hardware such as the processor 1001 and the memory 1002, so that the processor 1001 executes operations to control communication by the communication unit 1004, and reading and/or writing data on the memory 1002 and the storage 1003.

The processor 1001 controls the entire computer, for example, by running an operating system. The processor 1001 may be constituted with a central processing unit (CPU) including an interface with peripheral devices, a control unit, an arithmetic and logic unit, and registers. For example, the signal transmitter 101 and the signal receiver 102 of the user device UE may be implemented by the processor 1001.

Also, the processor 1001 reads out a program (a program code), a software module, or data from the storage 1003 and/or the communication unit 1004 into the memory 1002, and executes various types of processes accordingly. As the program, a program is used that causes the computer to execute at least a part of the operations described in the above embodiments. For example, the signal transmitter 101 and the signal receiver 102 of the user device UE may be implemented by a control program that is stored in the memory 1002, and executed by the processor 1001; the other functional blocks may be also implemented similarly. Although the above-mentioned various types of processes have been described to be executed by the single processor 1001, the processes may be executed by two or more processors 1001 simultaneously or sequentially. The processor 1001 may be implemented by one or more chips. Note that the program may be transmitted from a network via a telecommunication channel.

The memory 1002 is a computer-readable recording medium, which may be constituted with, for example, at least one of a ROM (Read-Only Memory), an EPROM (Erasable Programmable ROM), an EEPROM (Electrically Erasable Programmable ROM), and a RAM (Random Access Memory). The memory 1002 may be referred to as a register, a cache, a main memory (a main storage device), and the like. The memory 1002 can store a program (a program code), a software module, and the like that can be executed for implementing the method for transmitting a signal according to an embodiment of the present invention.

The storage 1003 is a computer-readable recording medium, which may be constituted with, for example, at least one of an optical disk such as a CD-ROM (Compact Disc ROM), a hard disk drive, a flexible disk, a magneto-optical disk (e.g., a compact disk, a digital multi-use disk, or a Blu-ray (registered trademark) disk), a smart card, a flash memory (e.g., a card, a stick, or a key drive), a floppy (registered trademark) disk, and a magnetic strip. The storage 1003 may be referred to as an auxiliary storage device. The storage medium described above may be, for example, a database, a server, or any other suitable medium that includes the memory 1002 and/or the storage 1003.

The communication unit 1004 is hardware (a transceiver device) for executing communication between computers via a wired and/or wireless network, which may be referred to as, for example, a network device, a network controller, a network card, or a communication module. For example, the signal transmitter 101 and the signal receiver 102 of the user device UE may be implemented by the communication unit 1004.

The input unit 1005 is an input device to receive input from the outside (e.g., a keyboard, a mouse, a microphone, a switch, a button, and a sensor). The output unit 1006 is an output device to execute outputting to the outside (e.g., a display, a speaker, and an LED lamp). Note that the input unit 1005 and the output unit 1006 may be configured as an integrated unit (e.g., a touch panel).

Also, the devices such as the processor 1001 and the memory 1002 are connected via a bus 1007 for communicating information. The bus 1007 may be constituted with a single bus, or may be constituted with buses which are different among the devices.

Further, the user device UE may be configured to include hardware such as a microprocessor, a digital signal processor (DSP), an ASIC (Application Specific Integrated Circuit), a PLD (Programmable Logic Device), and an FPGA (Field Programmable Gate Array), and a part of or all of the functional blocks may be implemented by the hardware. For example, the processor 1001 may be implemented by at least one of these hardware components.

SUMMARY

According to an embodiment, a user device in a wireless communication system supporting D2D communication is provided that includes a first transmitter configured to transmit control information for D2D by using a physical control channel for D2D in a wireless frame configuration in which a physical control channel for D2D and a physical data channel for D2D are frequency-multiplexed; and a second transmitter configured to transmit data corresponding to the control information for D2D by using a physical data channel for D2D in the wireless frame configuration in which a physical control channel for D2D and a physical data channel for D2D are multiplexed in a frequency domain. This user device UE provides a technology that can transmit and receive a small packet effectively and with a low delay in D2D communication.

The second transmitter may transmit the data in a predetermined subframe corresponding to a subframe by which the control information for D2D has been transmitted. This makes it possible to reduce information about the time axis in the SCI, and the user device UE can effectively transmit and receive the SCI even if the wireless frame configuration having a low delay is used.

Also, according to an embodiment, a user device in a wireless communication system supporting D2D communication is provided that includes a first transmitter configured to transmit control information for D2D by using a physical control channel for D2D in a subframe in which a physical control channel for D2D and a physical data channel for D2D are sequentially time-multiplexed; and a second transmitter configured to transmit data corresponding to the control information for D2D by using a physical data channel for D2D in the subframe or a physical data channel in a subframe different from the subframe. This user device UE provides a technology that can transmit and receive a small packet effectively and with a low delay in D2D communication.

Also, the first transmitter may map a reference signal onto a symbol at a center among a plurality of symbols that are consecutive and correspond to a physical control channel for D2D, to map the control information for D2D onto a symbol other than the symbol onto which the reference signal is mapped among the symbols that are consecutive, to transmit the control information for D2D. This makes it possible to improve precision of channel estimation that it is executed when decoding the SCI on the user device UE on the receiving side.

Also, the second transmitter may transmit the data by using a specific wireless resource used for transmitting data having a predetermined data length to be prioritized among the wireless resources allocated to a physical control channel for D2D or a physical data channel for D2D. This makes it possible for the user device UE on the receiving side to decode data having a high emergency without receiving the SCI.

Also, the control information for D2D may include information to specify a subframe section onto which the data is mapped in a wireless resource allocated to a physical data channel for D2D. This makes it possible to prevent the wireless resources from being allocated wastefully when allocating the wireless resources to be suitable for transmitting by comparatively long periods and by an event trigger.

Also, the second transmitter may transmit the data by a subcarrier corresponding to a subcarrier by which the control information for D2D has been transmitted. This makes it possible to reduce information about the frequency axis in the SCI, and the user device UE can effectively transmit and receive the SCI even if the wireless frame configuration having a low delay is used.

Also, the first transmitter may determine whether to transmit the control information for D2D by using a first control information format for D2D or to transmit the control information for D2D by using a second control information format for D2D different from the first control information format for D2D, depending on a range of the wireless resources allocated to the physical control channel for D2D. This makes it possible for the user device UE on the receiving side to reduce the processing load when executing blind detection of the SCI.

Also, according to the embodiment, a method for transmitting a signal executed by a user device in a wireless communication system supporting D2D communication is provided that includes a step for transmitting control information for D2D by using a physical control channel for D2D in a wireless frame configuration in which a physical control channel for D2D and a physical data channel for D2D are frequency-multiplexed; and a step for transmitting data corresponding to the control information for D2D by using a physical data channel for D2D in the wireless frame configuration in which a physical control channel for D2D and a physical data channel for D2D are multiplexed in a frequency domain. This method for transmitting a signal provides a technology that can transmit and receive a small packet effectively and with a low delay in D2D communication.

Also, according to the embodiment, a method for transmitting a signal executed by a user device in a wireless communication system supporting D2D communication is provided that includes a step for transmitting control information for D2D by using a physical control channel for D2D in a subframe in which a physical control channel for D2D and a physical data channel for D2D are sequentially time-multiplexed; and a step for transmitting data corresponding to the control information for D2D by using a physical data channel for D2D in the subframe or a physical data channel in a subframe different from the subframe. This method for transmitting a signal provides a technology that can transmit and receive a small packet effectively and with a low delay in D2D communication.

<Supplementation of Embodiments>

The PSCCH in an embodiment may be another control channel as long as it is a control channel to transmit control information (SCI and the like) used for D2D communication. Also, the PSSCH may be another data channel as long as it is a data channel to transmit data (MACPDU and the like) used for D2D communication. Also, the PSDCH may be another data channel as long as it is a data channel to transmit data (a discovery message and the like) used for D2D communication of the D2D discovery.

A D2D signal, an RRC signal, and a control signal may be a D2D message, an RRC message, and a control message, respectively.

A method claim presents various elements of steps in sample sequences, and is not limited to a particular sequence unless explicitly specified in the claim.

The embodiments of the present invention can be expanded for a system using LTE, LTE-A, CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-Wideband), Bluetooth (registered trademark), and/or other appropriate systems.

The configurations of the devices (user devices UE) described in the embodiments of the present invention may be configured to include a CPU and a memory, and to be realized by executing a program by the CPU (processor), or may be realized by hardware such as hardware circuits including the processing logic described in the embodiments, or may be configured to have a program and hardware coexist.

So far, the embodiments of the present invention have been described, but the disclosed invention is not limited to the embodiments; those skilled in the art may conceive of various transformed examples, modified examples, alternative examples, substituted examples, and the like. To facilitate understanding the present invention, specific numerical values have been used as examples in the description; note that such numerical values are just examples, and any appropriate values may be used unless specified otherwise. Partitioning of items in the above description is not essential in the present invention, features described in two or more items may be combined and used if necessary, and a feature described in an item may be applied to another feature described in another item as long as no contradiction arises. The boundaries of the functional units or the processing units in the functional block diagram do not necessarily correspond to the boundaries of physical components. The operations by multiple functional units may be executed by a physically single component, or the operations by a single functional unit may be executed by physically multiple components. The sequence charts and the flowcharts that have been described in the embodiments may have a sequence of steps changed as long as no contradiction arises. For the sake of description, the user device UE has been described by using the functional block diagrams, but the device may be implemented in hardware, software, or a combination of those. The software running on the processor included in the user device UE according to an embodiment of the present invention, may be stored in any proper storage medium such as a random access memory (RAM), a flash memory, a read-only memory (ROM), an EPROM, an EEPROM, registers, a hard disk (HDD), a removable disk, a CD-ROM, a database, and a server.

Note that in the embodiments, the SCI is an example of control information for D2D. The PSCCH is an example of a physical control channel for D2D. The PSSCH is an example of a physical data channel for D2D. The virtual resource pool is an example of specific wireless resources used for transmitting data having a predetermined data length to be prioritized. The MACPDU is an example of data. The SCI format (SCI format 0) is an example of a first control information format for D2D. A new SCI format in the embodiment is an example of a second control information format for D2D.

DESCRIPTION OF REFERENCE SIGNS

UE user device
eNB base station
101 signal transmitter
102 signal receiver
1001 processor
1002 memory
1003 storage
1004 communications unit
1005 input unit
1006 output unit

The invention claimed is:

1. A terminal comprising:
a reception unit configured to receive a device-to-device communication (D2D) control information and data corresponding to the D2D control information by using a D2D physical control channel and a D2D physical data channel multiplexed with the D2D physical control channel using at least one of frequency multiplexing and time multiplexing, in a unit resource constituting a radio resource; and a control unit configured to obtain the data based on the D2D control information, wherein the reception unit receives, in the unit resource, a reference signal time-multiplexed with the D2D physical control channel and the D2D physical data channel, and wherein the D2D control information is one of first control information that includes information related to a radio resource in a time axis and a frequency axis to which the data is allocated, and second control information that does not include information related to the radio resource, and the control unit obtains the data using the second control information.

2. The terminal according to claim 1, wherein a transmission bandwidth of the D2D physical control channel is different from a transmission bandwidth of the D2D physical data channel.

3. The terminal according to claim 2, wherein the reception unit receives a plurality of the D2D control information items in the unit resource.

4. The terminal according to claim 2, wherein the control unit determines that the D2D physical data channel is not allocated to a last symbol in the unit resource.

5. The terminal according to claim 2, wherein which of the first control information or the second control information is the D2D control information is based on a resource range to which the first control information and the second control information are allocated.

6. The terminal according to claim 1, wherein the reception unit receives a plurality of the D2D control information items in the unit resource.

7. The terminal according to claim 6, wherein the control unit determines that the D2D physical data channel is not allocated to a last symbol in the unit resource.

8. The terminal according to claim 6, wherein which of the first control information or the second control information is the D2D control information is based on a resource range to which the first control information and the second control information are allocated.

9. The terminal according to claim 1, wherein the control unit determines that the D2D physical data channel is not allocated to a last symbol in the unit resource.

10. The terminal according to claim 9, wherein which of the first control information or the second control information is the D2D control information is based on a resource range to which the first control information and the second control information are allocated.

11. The terminal according to claim 1, wherein which of the first control information or the second control information is the D2D control information is based on a resource range to which the first control information and the second control information are allocated.

12. The terminal according to claim 1, wherein the reception unit receives the reference signal at the first symbol of the unit resource, and the control unit performs automatic gain control (AGC) using the reference signal.

13. A communication method of a terminal, the method comprising:

receiving a device-to-device communication (D2D) control information and data corresponding to the D2D control information by using a D2D physical control channel and a D2D physical data channel multiplexed with the D2D physical control channel using at least one of frequency multiplexing and time multiplexing, in a unit resource constituting a radio resource; and obtaining the data based on the D2D control information, wherein in the receiving, in the unit resource, a reference signal time-multiplexed with the D2D physical control channel and the D2D physical data channel is received, and wherein the D2D control information is one of first control information that includes information related to a radio resource in a time axis and a frequency axis to which the data is allocated, and second control information that does not include information related to the radio resource, and data is obtained using the second control information.

14. A terminal comprising:

a control unit configured to multiplex, in a unit resource constituting a radio resource, a device-to-device (D2D) physical control channel, a D2D physical data channel, and a reference signal, by using at least one of frequency multiplexing and time multiplexing; and a transmission unit configured to transmit, in the unit resource, using the D2D physical control channel and the D2D physical data channel, D2D control information, data corresponding to the D2D control information, and the reference signal, wherein the D2D control information is one of first control information that includes information related to a radio resource in a time axis and a frequency axis to which the data is allocated, and second control information that does not include information related to the radio resource, and the data is obtained using the second control information.

15. A radio communication system in which a first terminal and a second terminal perform a device-to-device (D2D) communication, wherein:

the first terminal includes:
a control unit configured to multiplex, in a unit resource constituting a radio resource, a device-to-device (D2D) physical control channel, a D2D physical data channel, and a reference signal, by using at least one of frequency multiplexing and time multiplexing; and a transmission unit configured to transmit, in the unit resource, using the D2D physical control channel and the D2D physical data channel, D2D control information, data corresponding to the D2D control information, and the reference signal, wherein the D2D control information is one of first control information that includes information related to a radio resource in a time axis and a frequency axis to which the data is allocated, and second control information that does not include information related to the radio resource, and the data is obtained using the second control information, and the second terminal includes:
a reception unit configured to receive, in the D2D physical control channel and the D2D physical data channel, the D2D control information, the data, and the reference signal; and a control unit configured to obtain the data based on the D2D control information.

* * * * *